Oct. 11, 1966 M. FAVRE 3,278,791

ELECTRON DISCHARGE DEVICE HAVING A PLURALITY OF EMISSIVE SURFACES

Filed Jan. 8, 1963 5 Sheets-Sheet 1

INVENTOR
MAURICE FAVRE
BY Paul M. Craig Jr.
ATTORNEY

Oct. 11, 1966 M. FAVRE 3,278,791

ELECTRON DISCHARGE DEVICE HAVING A PLURALITY OF EMISSIVE SURFACES

Filed Jan. 8, 1963 5 Sheets-Sheet 2

INVENTOR
MAURICE FAVRE
BY Paul M. Craig Jr
ATTORNEY

Oct. 11, 1966 M. FAVRE 3,278,791

ELECTRON DISCHARGE DEVICE HAVING A PLURALITY OF EMISSIVE SURFACES

Filed Jan. 8, 1963 5 Sheets-Sheet 3

INVENTOR:
Maurice FAVRE

BY Paul M. Craig, Jr.
ATTORNEY

INVENTOR:
Maurice FAVRE
BY Paul M. Craig, Jr.
ATTORNEY

INVENTOR:
Maurice FAVRE
BY Paul M. Craig, Jr.
ATTORNEY 3,278,791

ELECTRON DISCHARGE DEVICE HAVING A PLURALITY OF EMISSIVE SURFACES

Maurice Favre, Paris, France, assignor to CSF-Compagnie Generale de Telegraphie Sans Fil, Paris, France Filed Jan. 8, 1963, Ser. No. 250,465
Claims priority, application France, Oct. 14, 1960, 841,171; Apr. 18, 1961, 859,044; Jan. 19, 1962, 885,288
12 Claims. (Cl. 315—3.5)

The present application is a continuation-in-part application of my copending application S.N. 143,705, filed October 9, 1961.

The present invention relates to microwave electronic tubes having electron guns operating with crossed electric and magnetic fields.

The useful signals, delivered at the output of these tubes, are generally adversely affected by parasitic noises which originate within the tubes themselves, and the present invention has as its principal object a tube of this type, provided with an improved electron gun structure thanks to which the parasitic noises are eliminated or at least considerably reduced.

According to the present invention, an electron discharge device comprises an electron gun operating with crossed electric and magnetic fields and having an emissive cathode substantially formed by a number of parallel emissive bands which are separated between one another by non-emissive intervals.

If the electron gun structure comprises an accelerating anode facing the cathode, then the emissive bands are disposed, according to one embodiment of the present invention, on the side facing this anode, and according to a modified embodiment of the present invention, on the opposite side thereof.

It has been noted that within the tubes having electron gun structures of classic construction and provided with crossed fields, that is having an undivided emissive cathode surface, the parasitic noises are particularly intensive when the electric field between the cathode and anode presents a minimum of potential in the neighborhood of the cathode, that is, in the presence of a space charge. On the other hand, actual experiments have shown that these parasitic noises are eliminated or at least considerably reduced if the classic cathodes are replaced by cathodes having a divided emissive surface in accordance with the present invention.

To explain this result obtainable in accordance with the present invention, it may be assumed or admitted, it being understood that this in no way affects the validity of the present invention, that the noises in question are due to phenomena which originate within the beam at the moment of the emission of the electrons and that these phenomena are amplified by the tight coupling of different elementary electron streams of the usual beams within the part of the path thereof adjacent the cathode. The elimination of noises may, therefore, be attributed in large part to the separation of these streams and to the suppression of the mutual couplings near the cathode.

Accordingly, it is an object of the present invention to provide an electron discharge device, especially of the type having an electron gun structure operating with crossed electric and magnetic fields, which effectively eliminates the shortcomings and inadequacies of the prior art constructions by eliminating or at least significantly reducing the noise signals present in the output of the tube.

Another object of the present invention resides in the provision of a cathode construction for use with an electron gun in electron discharge devices of the type described hereinabove which effectively aids, by simple means, in the suppression of noises that originate within the tube itself.

Still another object of the present invention resides in the provision of an electron discharge device having an electron gun structure operable with crossed electric and magnetic fields in which the signal to noise ratio in the output thereof is greatly improved by eliminating the generation of noises within the electron beam itself, particularly within the area of the electron gun thereof.

Another object of the present invention resides in the application of the improvements according to the present invention to known electron gun structures of the type shown and described in French Patent 982,527 of July 12, 1943, this patent disclosing electron gun structures in which the cathode and the accelerating anode facing the cathode have a shape with symmetry of revolution about an axis parallel to the cathode surface, the magnetic field being directed in the direction of this axis, and an auxiliary electric field being also provided in the axial direction in such a manner as to concentrate the electrons into a tubular beam which simultaneously turns about itself and propagates in the direction of this axis.

A further object of the present invention resides in the application thereof to tubes with crossed electric and magnetic fields, so-called M-type tubes of the classical type as well as also of a construction having a symmetry of revolution as described in U.S. Patent 2,761,088 to Warnecke et al., assigned to the same assignee, and to travelling wave tubes without crossed fields, so-called O-type tubes as well as to Klystron tubes such as described, for example, in the aforementioned French Patent 982,527.

These and other objects, features and advantages of the present invention will become more obvious from the following description when taken in connection with the accompanying drawing which shows, for purposes of illustration only, several embodiments in accordance with the present invention, and wherein, FIGURE 1 is a somewhat schematic longitudinal cross sectional view through an electron discharge device provided with a cathode structure in accordance with the present invention.

FIGURES 15–18 are perspective views of four different embodiments of cathodes in accordance with the present invention for use, in particular, with electron gun structures of the type shown in FIGURE 13, and FIGURES 19–21 are three schematic views indicating three examples of application of electron gun structures in accordance with the present invention to M-type tubes having a symmetry of revolution, to O-type tubes and to Klystrons, respectively.

Figure 1:
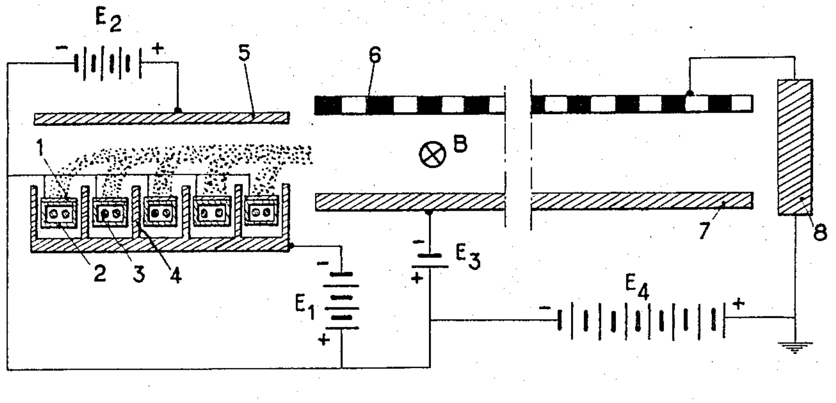

Referring now to the drawing wherein like reference numerals are used throughout the various views to designate corresponding parts, and more particularly to FIGURE 1, this figure illustrates schematically and in longitudinal cross section an electron discharge device having crossed electric and magnetic fields in accordance with the present invention, the usual casing or envelope found with the tube illustrated in this figure having been omitted for sake of simplicity of the drawing.

Figure 2:
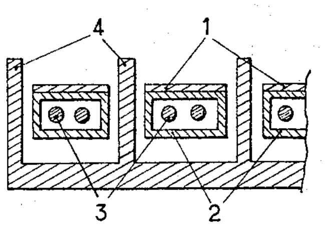
FIGURE 2 is a partial cross sectional view, on an enlarged scale, of the cathode structure of FIGURE 1.

The tube of FIGURE 1 comprises a cathode, partially shown on an enlarged scale in FIGURE 2, and formed by a series of emissive bands 1, carried by hollow conductor supports 2 at the inside of which are located heating filaments 3. Metallic partition walls 4 are disposed within the intervals separating the supports 2.

An accelerating anode 5 faces the emissive surface of the bands 1. A delay line of any conventional construction, indicated only schematically in FIGURE 1 and designated therein by reference numeral 6, extends parallelly to a negative electrode 7 usually referred to as the "sole" electrode. A target or collector electrode 8 is disposed at the end of the interaction space in the direction of flow of the electron beam.

A direct current voltage source $E_1$ enables to carry the partition wall assembly 4 at a negative potential with respect to the band assembly 1 which form the emissive cathode whereas the sources $E_2$, $E_3$ and $E_4$ permit to establish the appropriate differences of potential between the cathode and the electrodes 5, 6, 7 and 8.

A suitable heating source, not illustrated in the drawing, permits heating of the filaments 2 which in turn heat indirectly the emissive bands 1.

Additionally, a magnet or an electromagnet, not shown in the drawing, produces a magnetic field indicated schematically by the circle B, which is directed parallel to the length of the emissive bands 1 and perpendicular to the plane of the figure of the drawing over the entire length of the tube.

Since travelling wave tubes utilizing either a direct or backward wave, and particularly those operating with crossed electric and magnetic fields are well known in the art at present, an explanation of the operation thereof is believed unnecessary and, therefore, dispensed with herein.

Within the tube illustrated in FIGURE 1, the electrodes 5, 6, 7 and 8 are constructed and arranged in accordance with well known design principles of the art and, therefore, do not form any part of the present invention.

The improvement contributed by the present invention resides in a new cathode structure which comprises the emissive bands 1 and the partition walls 4 which may be maintained either at the same potential as the bands 1 or at a negative potential with respect thereto as indicated in FIGURE 1.

The electron beam emitted by the structure illustrated in FIGURE 1 is divided or split up at the output of the cathode into elementary electron streams or beams which rejoin one another shortly after they have traversed individual paths well separated one from another.

In the modified embodiment illustrated in FIGURE 3, the emissive bands 1 of the cathode are separated by cylindrical cavities 9, and the heater filaments 3 are placed within a cavity or space 10 provided within the cathode block below the cavities 9.

Figure 4:
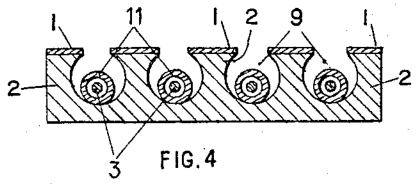

In the embodiment of FIGURE 4, the heater filaments 3 are placed within the cylindrical cavities 9 and are insulated from the metal of these cylinders 9 by ceramic cylinders 11.

Figure 3:
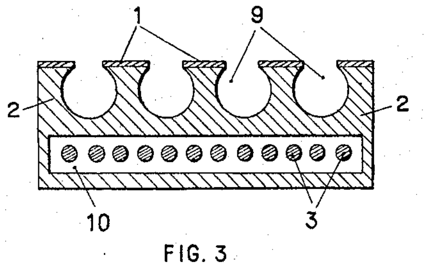
FIGURES 3 to 5 are cross sectional views, similar to FIGURE 2, of different embodiments of cathode structures in accordance with the present invention for use in a tube illustrated in FIGURE 1.
Figure 5:
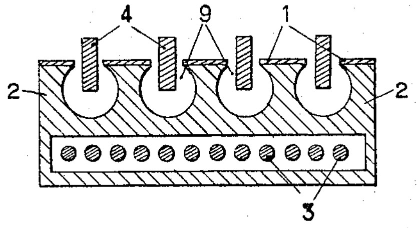

The cathode structure of FIGURE 5 differs from that of FIGURE 3 only by the addition of partition walls 4, disposed within the cavities 9 which separate the emissive bands 1, whereby these partition walls 4 may be carried at a zero or at a negative potential with respect to the cathode.

The indirect heating of the cathode structures described hereinabove may also be replaced by a direct heating arrangement, utilizing bands or ribbons covered with emissive oxides and heated directly by a current traversing the same.

In all of the embodiments of FIGURES 1 to 5, the emissive surfaces of the cathode elements are disposed facing the accelerating anode 5.

According to a modified embodiment in accordance with the present invention, cathode elements are utilized which have non-emissive faces facing the accelerating anode and faces covered with emissive layers on the opposite side thereof, in which case an auxiliary electrode, carried at a positive potential with respect to the cathode elements, is disposed facing the emissive surfaces of the cathode structure.

Such an arrangement is illustrated in FIGURES 6 through 12 of the present application.

FIGURE 6 again illustrates schematically and in longitudinal cross section a tube provided with crossed fields according to the present invention, the envelope of the tube being again omitted for simplicity's sake of the drawing.

In the left portion of this drawing, there can be seen in transverse cross section a series of hollow conductors 2 constituting the cathode of the tube. These conductors 2 which may also be seen on an enlarged scale in FIGURE 7 have a rectangular cross section and carry in the lower part thereof a layer of an emissive substance 1. Heater filaments 3 are disposed on the inside of the conductors 2 and an auxiliary electrode 14 forming an auxiliary anode is disposed facing the emissive layers 1 of the conductors 2. Metallic walls or baffle plates 4, integral with the electrode 14, form partition between the conductors 2.

An accelerating anode 5 faces the non-emissive portion of the conductors 2. A delay line of any conventional construction, illustrated only schematically in the drawing and designated therein by reference numeral 6 extends parallelly to a negative electrode 7, referred to normally as "sole" electrode, and a target or collector electrode is disposed at 8.

Direct current voltage sources $E_1$, $E_2$, $E_3$ and $E_4$ again permit to establish appropriate differences of potential between the different electrodes and the cathode whereas a magnet or electromagnet, again not illustrated in the drawing, provides a magnetic field schematically indicated by the circle B which is parallel to the length of the conductors 2 and perpendicular to the plane of the drawing over the entire length of the tube.

Additionally, a heater source of conventional construction, again not illustrated in the drawing, permits to heat the filaments 3 which in turn heat directly the conductors 2.

In operation, the auxiliary anode 14 is carried, by means of the voltage source $E_1$ at a positive potential with respect to the conductors 2 sufficient to produce the electron emission from the emissive layer 2 when the indirect heating of conductors 2 is assured by the heating of filaments 3.

The presence within the tube of an electric field and a magnetic field crossed with respect to each other causes the released or freed electrons to describe trajectories or paths such as indicated by the curves shown in the drawing in dash line and designated therein by reference numeral 19. If, therefore, the magnetic field is directed in a suitable sense, for example, from in front of the plane of the drawing toward the back thereof in the case of FIGURE 6, the electrons emitted by the emissive faces of the conductors 2 enter into the interaction space comprised between the delay line 6 and the sole 7 as within tubes of this type provided with classic cathodes of conventional construction.

Figure 6:
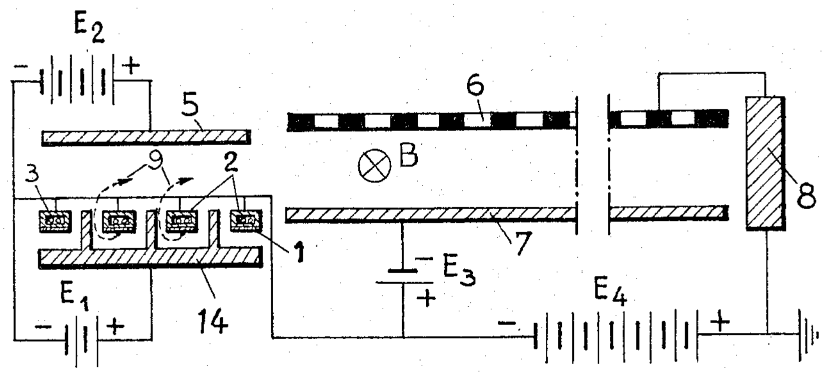
FIGURE 6 is a somewhat schematic longitudinal cross sectional view through a modified embodiment of an electron discharge device having a cathode structure in accordance with the present invention.
Figure 7:
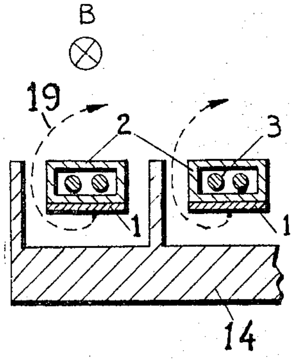
FIGURE 7 is a partial cross sectional view, on an enlarged scale, of a detail of the cathode structure of FIGURE 6.

The cross section of the cathode conductors 2 which is rectangular in FIGURES 6 and 7 may also assume any other shape.

Figure 8:
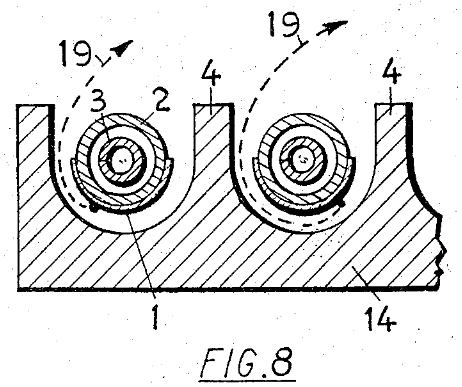
FIGURES 8 through 12 are partial cross sectional views, similar to FIGURE 7, through five further modified embodiments of a cathode structure of the type illustrated in FIGURES 6 and 7.

The modified embodiment illustrated in FIGURE 8 comprises cylindrical conductors 2 on which may be seen, as in the preceding embodiment, the emissive layer 1. The filaments 3 which traverse the cylinders 2 are wound therein in helix form whereas the auxiliary anode 14 is of sectional shape as shown and comprises walls or baffles 4 disposed between adjacent cylinders.

Figures 9, 10, 11, 12:
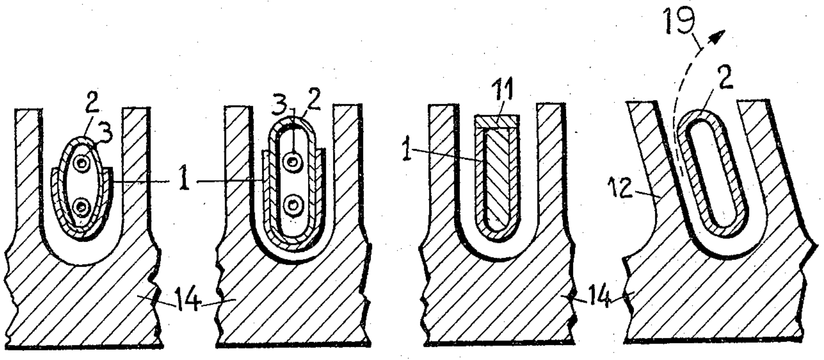

In FIGURES 9 and 10, the cathode conductors 2 have an elongated cross section which has the advantage of offering a larger surface to the emissive layer and therewith a greater electron output.

The indirect heating of the cathode structures of FIGURES 6 to 10 may also be replaced by a direct heating, utilizing bands or ribbons covered with emissive oxides and heated directly by a current traversing the same, which produces a structure with great current density by reason of the high ratio of emissive surface to horizontal surface. Such variation is illustrated by the embodiment of FIGURE 11 illustrating an emissive band or ribbon 1 supported by a non-emissive support 11.

It is also possible to incline the partition walls or baffles 12 which separate the cylinders 2 in the direction opposite to the direction of the beam 19 as shown in FIGURE 12 in order to obtain a better efficacy of the elements of the electron gun.

Figure 13:
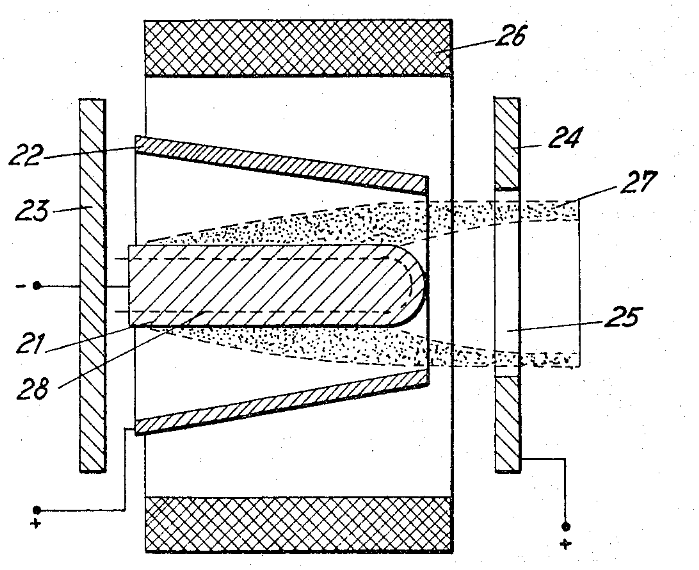
FIGURES 13 and 14 are two cross sectional views illustrating the prior art electron gun structures as disclosed in the aforementioned French Patent 982,527.

In FIGURE 13, reference numeral 21 designates a cylindrical cathode having an external emissive surface and heated by a filament 28. An anode 22 faces the cathode 21 and has the form of a body of symmetry of revolution coaxial with the cathode 21. Two electrodes 23 and 24, in the form of discs and disposed perpendicular to the axis of the system are located at both axial ends of the electron gun structure, and the electrode 24 is provided with an orifice 25 for the passage of the electron beam. It is understood that this system of electrodes is located within an evacuated envelope, not shown in this figure to simplify the drawing. A winding 26 supplies an axial magnetic field necessary to the proper operation of the electron gun structure. A suitable voltage is applied between the anode 22 and the cathode 21, and a positive voltage is applied to the electrode 24 with respect to the electrode 23, the latter being connected to the cathode 21. It is therefore clear that electrodes 23 and 24 provide an electric field directed parallel to the axis of the system.

In operation, provided that the magnetic field of the winding 26 is superior to the critical field which blocks the passage of the current toward the anode 22, and in the absence of the axial electric field, the electrons emitted by the cathode 21 turn about the cathode as in a magnetron. As the axial electric field is applied between the electrodes 23 and 24, the electrons receive additionally an axial velocity component which causes the electrons to be displaced in the axial direction, by concentrating the same into a tubular beam 27 turning about itself.

Figure 14:
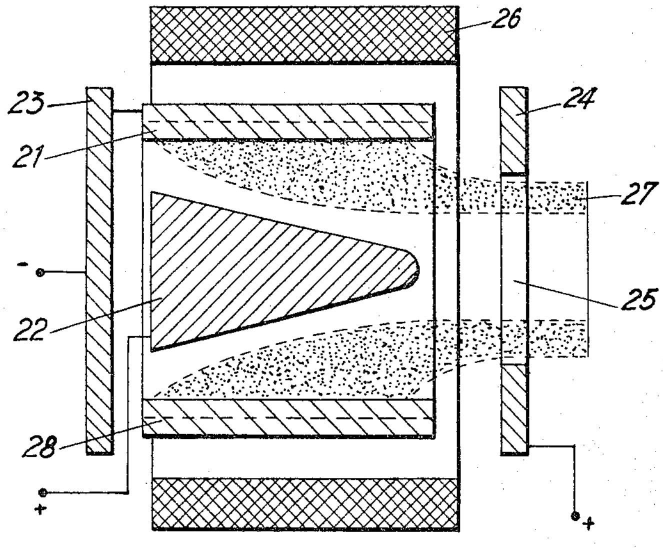

The electron gun structure of FIGURE 14 differs from that of FIGURE 13 by a reversal in the position of the cathode 21 and anode 22, the cathode of this embodiment being a hollow cylinder of which the internal surface is emissive, and the anode 22 being in the form of a cylinder or a conical body occupying the axial position. Otherwise, the same reference numerals as used in FIGURE 13 designate again analogous elements in FIGURE 14, the operation of this embodiment being the same and a tubular beam 27 being again supplied by the electron gun.

According to the present invention, the cathodes for the electron gun structures, of which FIGURES 13 and 14 give two examples, are divided in conformity with the present invention into a series of emissive elements, separated therebetween by non-emissive intervals.

Figures 15, 16, 17, 18:
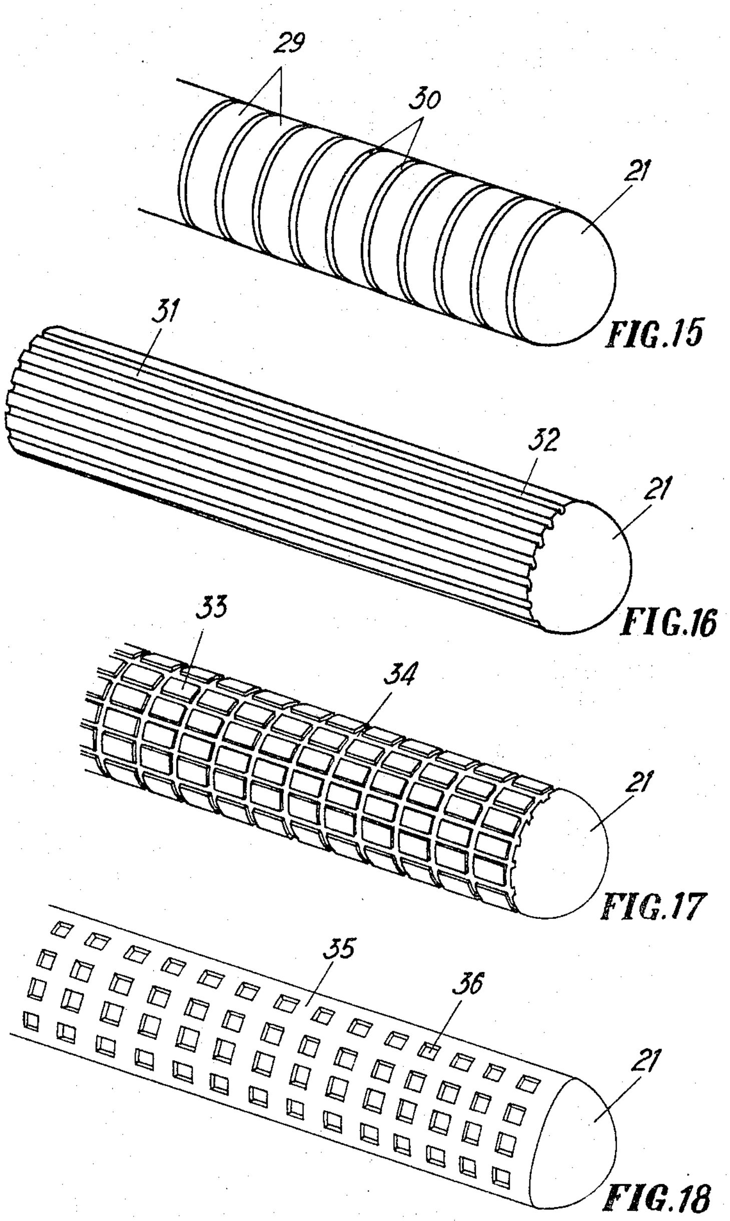

In the embodiment of FIGURE 15 which represents, for example, a cathode intended for use with the electron gun of FIGURE 13, these emissive elements are annular members 29, separated by non-emissive annular grooves 30.

In the embodiment of FIGURE 16, the emissive elements are longitudinal strips or bands 31 separated by partition walls 32.

In the embodiment of FIGURE 17, the emissive elements are rectangular blocks 33, separated by a network of two mutually perpendicular series of grooves 34.

In the embodiment of FIGURE 18, the surface of the cathode 21 is a non-emissive grid 35 of which the meshes 36 are filled with emissive material.

Of course, analogous dispositions could also be taken insofar as the internal surface of the hollow cylinder is concerned constituting the cathode 21 of FIGURE 14, it being understood that the internal surface thereof could be constructed in accordance with the teachings of any one of the preceding embodiments described herein.

Figure 19:
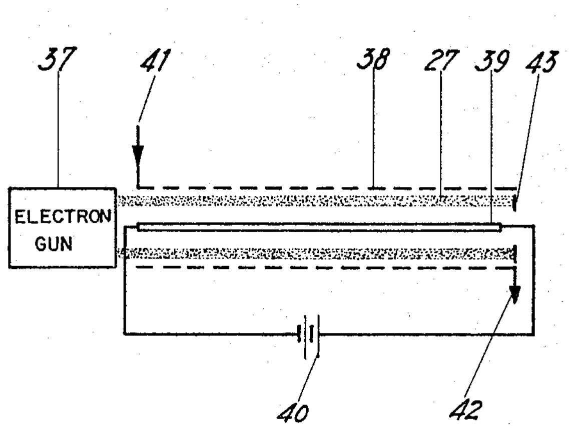

FIGURE 19 illustrates one example of an application of the present invention to an M-type tube having a symmetry of revolution. In this embodiment, reference numeral 37 designates one of the electron gun structures according to FIGURES 13 or 14 provided with the improvements according to any one of FIGURES 15 to 18 or analogous thereto. The electron beam 27 is injected into the interaction space comprised between a delay line 38 and an axial conductor 39 traversed by an intense current furnished from a source 40, with a view to produce a magnetic field with circular lines of force, crossing the radial electric field between the delay line 38 and the conductor 39, as described more fully in the aforementioned U.S. Patent 2,761,088. The beam is collected by a collector 43. Since the drawing represents, for example, an amplifier, input means 41 and output means 42 of the delay line 38 are schematically indicated in the drawing.

Figure 20:
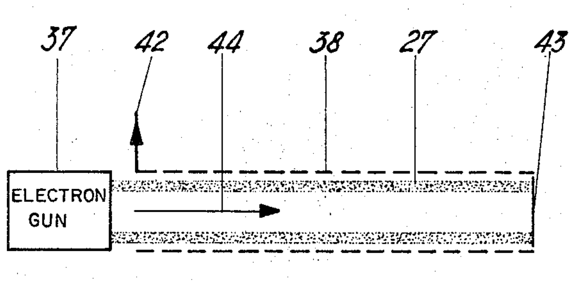

FIGURE 20 represents another example of an application of the present invention to a travelling wave tube of the O-type. The beam 27 enters into an interaction space on the inside of a delay line 38 and is captured by the collector 43. Within the interaction space is established the single axial magnetic focusing field, schematically indicated in this figure by the arrow 44. Since the drawing represents, for example, a backward wave oscillator, there has been shown an output means 42 at the side of the delay line near the electron gun structure 37.

Figure 21:
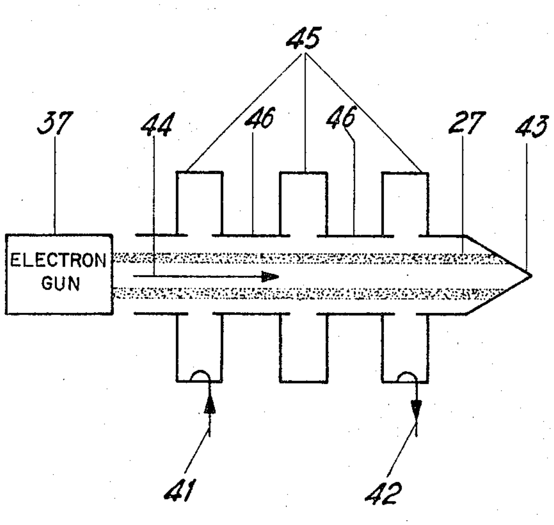

In the embodiment of FIGURE 21, the beam 27 is injected into a Klystron, for example, with three cavities 45 separated by drift spaces 46. The collector, the magnetic focusing field, the input means and the output means have been illustrated again schematically and designated in the drawing, respectively, by reference numerals 43, 44, 41 and 42, as in the preceding embodiments.

While I have shown and described several embodiments in accordance with the present invention, it is understood that the same is not limited thereto, but is susceptible of many changes and modifications within the spirit and scope thereof. For example, the tubes illustrated in FIGURES 1 and 6, shown therein as being of rectilinear structure may also be of circular shape as known in the art in which case the delay line and the sole are shaped along concentric cylinders. Thus, it is obvious that numerous changes and modifications may be made without departing from the scope and spirit of the present invention and I, therefore, do not wish to be limited to the details shown and described herein but intend to cover all such changes and modifications as are encompassed by the scope of the appended claims.

I claim:

1. A microwave electron tube comprising electron gun means for producing an electron beam, a pair of parallel electrodes defining therebetween an interaction space, a collector electrode, means for producing electric and magnetic fields perpendicular to each other, for propagating said beam through said inter-action space toward said collector electrode perpendicularly to both said fields, said electron gun means including cathode means and accelerating anode means facing each other, and means effectively heating said cathode means, said cathode means being provided with a number of substantially rectilinear conductors spaced apart and extending substantially in the direction of said magnetic field and with electron emissive means supported by said conductors and means for carrying said electron emissive means at a common direct current potential.

2. A microwave electron tube comprising electron gun means for producing an electron beam, means for producing electric and magnetic fields perpendicular to each other, for propagating said beam perpendicularly to both said fields, said electron gun means including cathode means and accelerating anode means facing each other, and means for effectively heating said cathode means, said cathode means being provided with a number of substantially rectilinear conductors spaced apart and extending substantially in the direction of said magnetic field and with electron emissive means supported by said conductors on the side thereof facing said accelerating anode and including metallic partitions disposed in the intervals separating said conductors, and means for carrying said partitions at a potential which is at most as high as the potential of said emissive means.

3. A microwave electron tube comprising electron gun means for producing an electron beam, a pair of parallel electrodes defining therebetween an interaction space, a collector electrode, means for producing electric and magnetic fields perpendicular to each other, for propagating said beam through said interaction space toward said collector electrode perpendicularly to both said fields, said electron gun means including cathode means and accelerating anode means facing each other, and means for effectively heating said cathode means, said cathode means being provided with a number of substantially rectilinear conductors spaced apart and separated by cylindrical cavities and extending substantially in the direction of said magnetic field and with electron emissive means supported by said conductors on the side thereof facing said accelerating anode and means for carrying said electron emissive means at a common direct current potential.

4. A microwave electron tube comprising electron gun means for producing an electron beam, means for producing electric and magnetic fields perpendicular to each other, for propagating said beam perpendicularly to both said fields, said electron gun means including cathode means and accelerating anode means facing each other, and means for effectively heating said cathode means, said cathode means being provided with a number of substantially rectilinear conductors spaced apart and separated by cylindrical cavities and extending substantially in the direction of said magnetic field and with electron emissive means supported by said conductors on the side thereof facing said accelerating anode, and a metallic partition in each of said cylindrical cavities.

5. A microwave electron tube comprising electron gun means for producing an electron beam, a pair of parallel electrodes defining therebetween an interaction space, a collector electrode, means for producing electric and magnetic fields perpendicular to each other, for propagating said beam through said interaction space toward said collector electrode perpendicularly to both said fields, said electron gun means including cathode means and accelerating anode means facing each other, means for effectively heating said cathode means, said cathode means being provided with a number of substantially rectilinear conductors spaced apart and extending substantially in the direction of said magnetic field and with electron emissive means supported by said conductors, said emissive means being on the side of said conductors which is remote from said accelerating anode, auxiliary electrode means substantially facing said emissive means, means for carrying said electron emissive means at a common direct current potential, and means for carrying said auxiliary electrode means at a positive potential with respect to said emissive means.

6. In a microwave electron discharge device having means for producing a flow of electrons, a pair of parallel electrodes defining therebetween an interaction space, a collector electrode, and means adapted to produce electric and magnetic fields substantially perpendicular to each other for supporting the electron flow through said interaction space toward said collector electrode, the improvement essentially consisting of a cathode structure having means for producing electron emission from said cathode structure, said cathode structure including a number of support means spaced apart and extending substantially in the direction of said magnetic field, electron emissive means on said support means and means for carrying said electron emissive means at a common direct current potential.

7. A microwave electron tube comprising electron gun means for producing an electron beam, a pair of parallel electrodes defining therebetween an interaction space, a collector electrode, means for producing electric and magnetic fields perpendicular to each other, for propagating said beam through said interaction space toward said collector electrode perpendicularly to both said fields, said electron gun means including cathode means and accelerating anode means facing each other, means for effectively heating said cathode means, said cathode means being provided with a number of substantially rectilinear conductors spaced apart and extending substantially in the direction of said magnetic field, with metallic partitions disposed between said conductors and with electron emissive means supported by said conductors, said emissive means being on the side of said conductors which is remote from said accelerating anode, auxiliary electrode means substantially facing said emissive means, means for carrying said electron emissive means at a common direct current potential and means for carrying said auxiliary electrode means at a positive potential with respect to said emissive means.

8. A microwave electron tube comprising electron gun means for producing an electron beam, a pair of parallel electrodes defining therebetween an interaction space, a collector electrode, means for producing electric and magnetic fields perpendicular to each other, for propagating said beam through said interaction space toward said collector electrode perpendicularly to both said fields, said electron gun means including cathode means and accelerating anode means facing each other, means for effectively heating said cathode means, said cathode means being provided with a number of substantially rectilinear conductors of substantially rectangular cross section spaced apart and extending substantially in the direction of said magnetic field and with electron emissive means supported by said conductors, said emissive means being on the side of said conductors which is remote from said accelerating anode, means for carrying said electron emissive means at a common direct current potential auxiliary electrode means at a positive potential with respect to said emissive means.

9. A microwave electron tube comprising electron gun means for producing an electron beam, a pair of parallel electrodes defining therebetween an interaction space, a collector electrode, means for producing electric and magnetic fields perpendicular to each other, for propagating said beam through said interaction space toward said collector electrode perpendicularly to both said fields, said electron gun means including cathode means and accelerating anode means facing each other, means for effectively heating said cathode means, said cathode means being provided with a number of substantially rectilinear conductors of substantially circular cross section spaced apart and extending substantially in the direction of said magnetic field and with electron emissive means supported by said conductors, said emissive means being on the side of said conductors which is remote from said accelerating anode, means for carrying said electron emissive means at a common direct current potential auxiliary electrode means substantially facing said emissive means, and means for carrying said auxiliary electrode means at a positive potential with respect to said emissive means.

10. A microwave electron tube comprising electron gun means for producing an electron beam, a pair of parallel electrodes defining therebetween an interaction space, a collector electrode, means for producing electric and magnetic fields perpendicular to each other, for propagating said beam through said interaction space toward said collector electrode perpendicularly to both said fields, said electron gun means including cathode means and accelerating anode means facing each other, means for effectively heating said cathode means, said cathode means being provided with a number of substantially rectilinear conductors of substantially elongated cross section and with electron emissive means supported by said conductors, said emissive means being on the side of said conductors which is remote from said accelerating anode, means for carrying said electron emissive means at a common direct current potential, auxiliary electrode means substantially facing said emissive means, and means for carrying said auxiliary electrode means at a positive potential with respect to said emissive means.

11. A microwave electron tube, comprising electron gun means for producing an electron beam, said electron gun means including cathode means and accelerating anode means substantially facing each other and defining an electron gun space therebetween, means for producing at least in said electron gun space electric and magnetic fields substantially perpendicular to each other, means for effectively heating said cathode means, said cathode means being provided with a number of electron-emissive areas mutually separated by substantially non-emissive areas and means for carrying said electron emissive areas at a common direct current potential.

12. A travelling wave tube of the M-type having a pair of electrodes defining therebetween an interaction space, comprising electron gun means for producing an electron beam through said interaction space, said electron gun means including cathode means and accelerating anode means facing each other and defining an electron gun space therebetween, means for producing in both said gun and interaction spaces electric and magnetic fields substantially perpendicular to each other, and means for effectively heating said cathode means, said cathode means being provided with a number of electron emissive areas mutually separated by substantially non-emissive areas and means for carrying said electron emissive areas at a common direct current potential.

References Cited by the Examiner

UNITED STATES PATENTS

| | | | |
|---|---|---|---|
| 2,581,243 | 1/1952 | Dodds | 313—338 X |
| 2,782,334 | 2/1957 | Gardner | 313—338 X |
| 2,817,040 | 12/1957 | Hull | 313—338 X |
| 2,832,005 | 4/1958 | Brown | 313—338 X |
| 2,844,752 | 7/1958 | Hoover | 313—338 X |
| 2,911,558 | 11/1959 | Currie | 313—338 X |
| 2,936,396 | 5/1960 | Currie | 315—39.3 X |
| 2,937,301 | 5/1960 | Germeshausen et al. | 313—338 X |
| 3,207,946 | 9/1965 | Haus et al. | 315—39.3 |

HERMAN KARL SAALBACH, *Primary Examiner.*

GEORGE N. WESTBY, *Examiner.*

S. CHATMON, Jr., *Assistant Examiner.*